(12) United States Patent
Lepres et al.

(10) Patent No.: US 8,803,381 B2
(45) Date of Patent: Aug. 12, 2014

(54) ELECTRIC MACHINE WITH COOLING PIPE COILED AROUND STATOR ASSEMBLY

(75) Inventors: Attila Lepres, Mezokovesd (HU); Karoly Komlossy, Debrecen (HU); Gabor Andejcsik, Veresegyhaz (HU)

(73) Assignee: Remy Technologies, LLC, Pendleton, IN (US)

( * ) Notice: Subject to any disclaimer, the term of this patent is extended or adjusted under 35 U.S.C. 154(b) by 310 days.

(21) Appl. No.: 13/180,342

(22) Filed: Jul. 11, 2011

(65) Prior Publication Data
US 2013/0015735 A1    Jan. 17, 2013

(51) Int. Cl.
*H02K 9/19* (2006.01)
*H02K 5/20* (2006.01)

(52) U.S. Cl.
USPC .............................. 310/64; 310/58; 310/60 A

(58) Field of Classification Search
IPC .................... H02K 9/197, 9/19, 9/16, 9/10, 5/20
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 2,887,062 A * | 5/1959 | Cametti et al. | 310/54 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 4,621,210 A | 11/1986 | Krinickas, Jr. | |
| 5,081,382 A | 1/1992 | Collings et al. | |
| 5,180,004 A | 1/1993 | Nguyen | |
| 5,207,121 A | 5/1993 | Blen | |
| 5,293,089 A | 3/1994 | Frister | |
| 5,372,213 A | 12/1994 | Hasebe et al. | |
| 5,519,269 A | 5/1996 | Lindberg | |
| 5,616,973 A | 4/1997 | Khazanov | |
| 5,798,587 A * | 8/1998 | Lee | 310/64 |
| 5,859,482 A | 1/1999 | Crowell et al. | |
| 5,923,108 A | 7/1999 | Matake et al. | |
| 5,937,817 A | 8/1999 | Schanz et al. | |
| 5,939,808 A | 8/1999 | Adames | |
| 5,965,965 A | 10/1999 | Umeda et al. | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report, Received Jul. 31, 2012.

(Continued)

*Primary Examiner* — Michael Andrews
(74) *Attorney, Agent, or Firm* — Greenberg Traurig, LLP

(57) ABSTRACT

Some embodiments of the invention provide an electric machine module include a housing. In some embodiments, the housing can include at least one end cap coupled to a central member. The housing can include a first axial end and a second axial end. The central member can include at least a portion of a coolant pipe, which can include end portions extending at least partially through the end cap. In some embodiments, an electric machine, which can include a stator assembly, can be positioned within the housing so that the coolant pipe is substantially coiled around at least a portion of an outer perimeter of the stator assembly.

11 Claims, 6 Drawing Sheets

(56) References Cited

U.S. PATENT DOCUMENTS

| | | | |
|---|---|---|---|
| 6,011,332 A | 1/2000 | Umeda et al. | |
| 6,069,424 A | 5/2000 | Colello et al. | |
| 6,075,304 A | 6/2000 | Nakatsuka | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,200,108 B1 * | 3/2001 | Caudill et al. | 417/366 |
| 6,201,321 B1 | 3/2001 | Mosciatti | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,291,918 B1 | 9/2001 | Umeda et al. | |
| 6,300,693 B1 | 10/2001 | Poag et al. | |
| 6,313,559 B1 | 11/2001 | Kusase et al. | |
| 6,333,573 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,404,628 B1 | 6/2002 | Nagashima et al. | |
| 6,417,592 B2 | 7/2002 | Nakamura et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Measegi | |
| 6,559,572 B2 | 5/2003 | Nakamura | |
| 6,579,202 B2 | 6/2003 | El-Antably et al. | |
| 6,617,716 B2 | 9/2003 | Ishida | |
| 6,770,999 B2 | 8/2004 | Sakurai | |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,239,055 B2 | 7/2007 | Burgman et al. | |
| 7,276,006 B2 | 10/2007 | Reed et al. | |
| 7,284,313 B2 | 10/2007 | Raszkowski et al. | |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,443,062 B2 | 10/2008 | Dong et al. | |
| 7,508,100 B2 | 3/2009 | Foster | |
| 7,538,457 B2 | 5/2009 | Holmes et al. | |
| 7,545,060 B2 | 6/2009 | Ward | |
| 7,589,441 B2 | 9/2009 | Kalsi et al. | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 2003/0222519 A1 | 12/2003 | Bostwick | |
| 2004/0036367 A1 | 2/2004 | Denton et al. | |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0035673 A1 * | 2/2005 | Lafontaine et al. | 310/58 |
| 2005/0194551 A1 | 9/2005 | Klaussner et al. | |
| 2005/0235672 A1 * | 10/2005 | Hsu et al. | 62/259.2 |
| 2005/0274450 A1 | 12/2005 | Smith et al. | |
| 2005/0285456 A1 | 12/2005 | Amagi et al. | |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2008/0223557 A1 | 9/2008 | Fulton et al. | |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2009/0261668 A1 * | 10/2009 | Mantere | 310/54 |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-301646 A | 12/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0001045 A | 1/2009 |
| KR | 10-2009-0048028 A | 5/2009 |
| KR | 10-2009-0073790 A | 7/2009 |
| KR | 10-2011-0012216 A | 2/2011 |

OTHER PUBLICATIONS

International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.

(56) References Cited

OTHER PUBLICATIONS

International Search Report completed Apr. 9, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.
KIPO Search Report and Written Opinion dated Jan. 23, 2013 for corresponding Application No. PCT/US2012/046172.

* cited by examiner

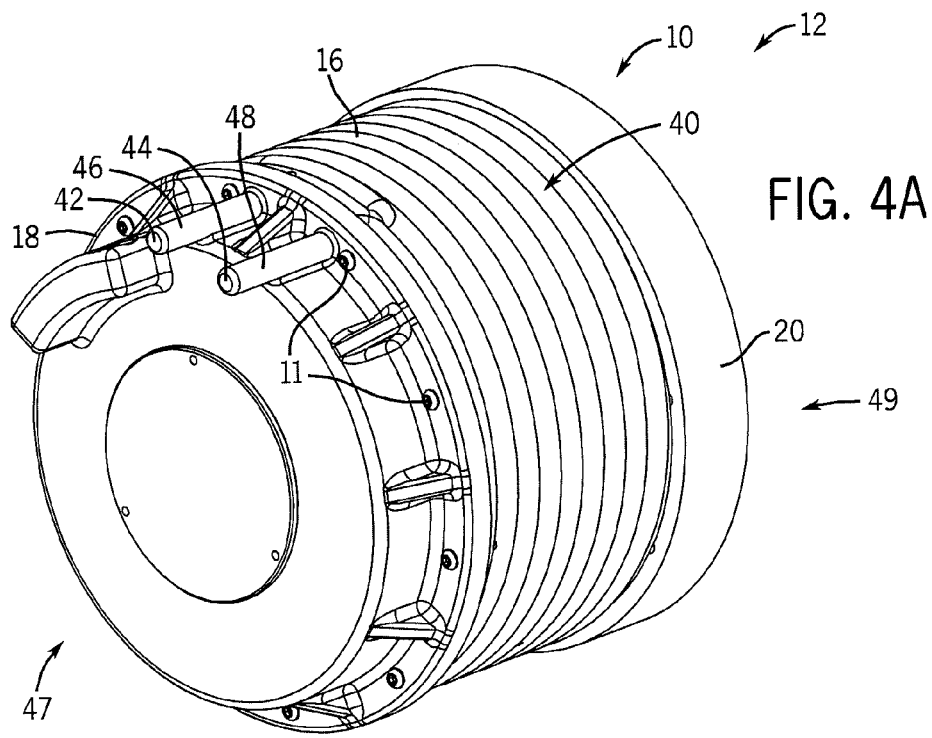
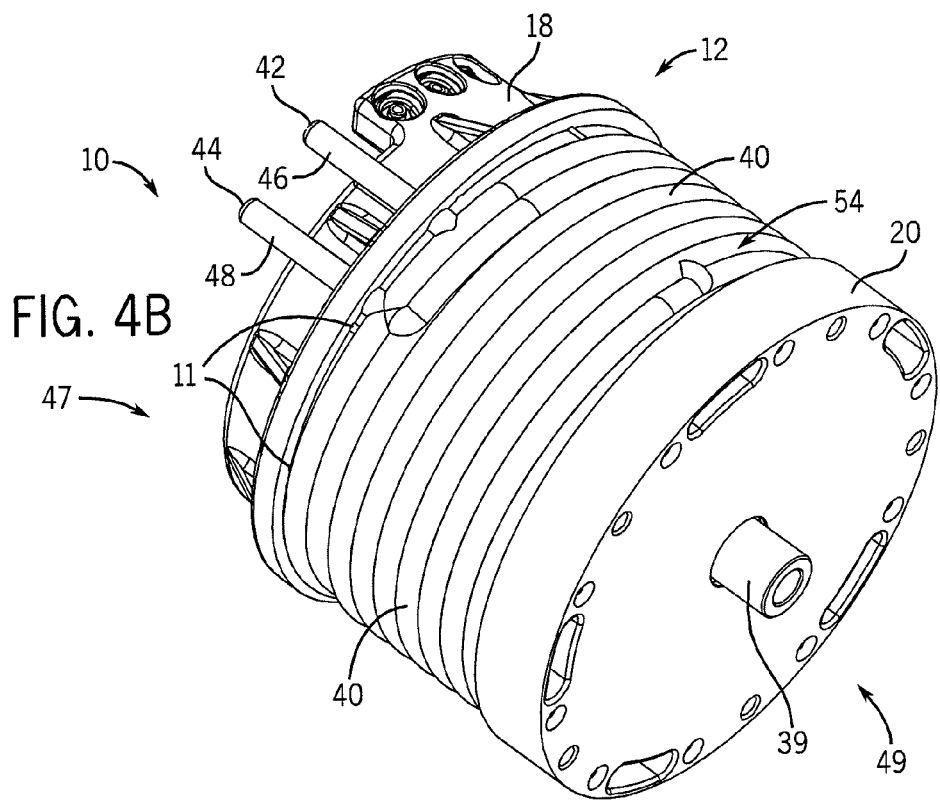

ELECTRIC MACHINE WITH COOLING PIPE COILED AROUND STATOR ASSEMBLY

BACKGROUND

Electric machines, often contained within a housing, are generally comprised of a stator assembly and a rotor assembly. During operation of the electric machines, heat energy can be generated by both the stator assembly and the rotor assembly, in addition to other components of the electric machines. Conventional cooling methods include removing heat energy via forced convection to a jacket filled with a coolant.

SUMMARY

Some embodiments of the invention provide an electric machine module including a housing. In some embodiments, the housing can include at least one end cap coupled to a central member. The housing can include a first axial end and a second axial end. The central member can include at least a portion of a coolant pipe, which can include end portions extending at least partially through the end cap. In some embodiments, an electric machine, which can include a stator assembly, can be positioned within the housing so that the coolant pipe is substantially coiled around at least a portion of an outer perimeter of the stator assembly.

Some embodiments of the invention include an electric machine module including an electric machine. In some embodiments, the electric machine can include a stator assembly. In some embodiments, a first end cap can be located immediately adjacent to a first axial end of the stator assembly and a second end cap can be located immediately adjacent to a second axial end of the stator assembly. In some embodiments, a central member can include at least a portion of a coolant pipe and the central member can substantially circumscribe at least a portion of the stator assembly. In some embodiments, the central member can be coupled to the first end cap and the second end cap. In some embodiments, the coolant pipe can be positioned in the central member so that the coolant pipe can be substantially coiled around at least a portion of an outer perimeter of the stator assembly. In some embodiments, the coolant pipe can include first and second end portions that can extend through at least a portion of the first end cap.

DESCRIPTION OF THE DRAWINGS

FIG. 4A is a perspective view of an electric machine module according to another embodiment of the invention.

FIG. 4B is a perspective view of some assembled parts of the electric machine module of FIG. 4A.

DETAILED DESCRIPTION

Figure 1:
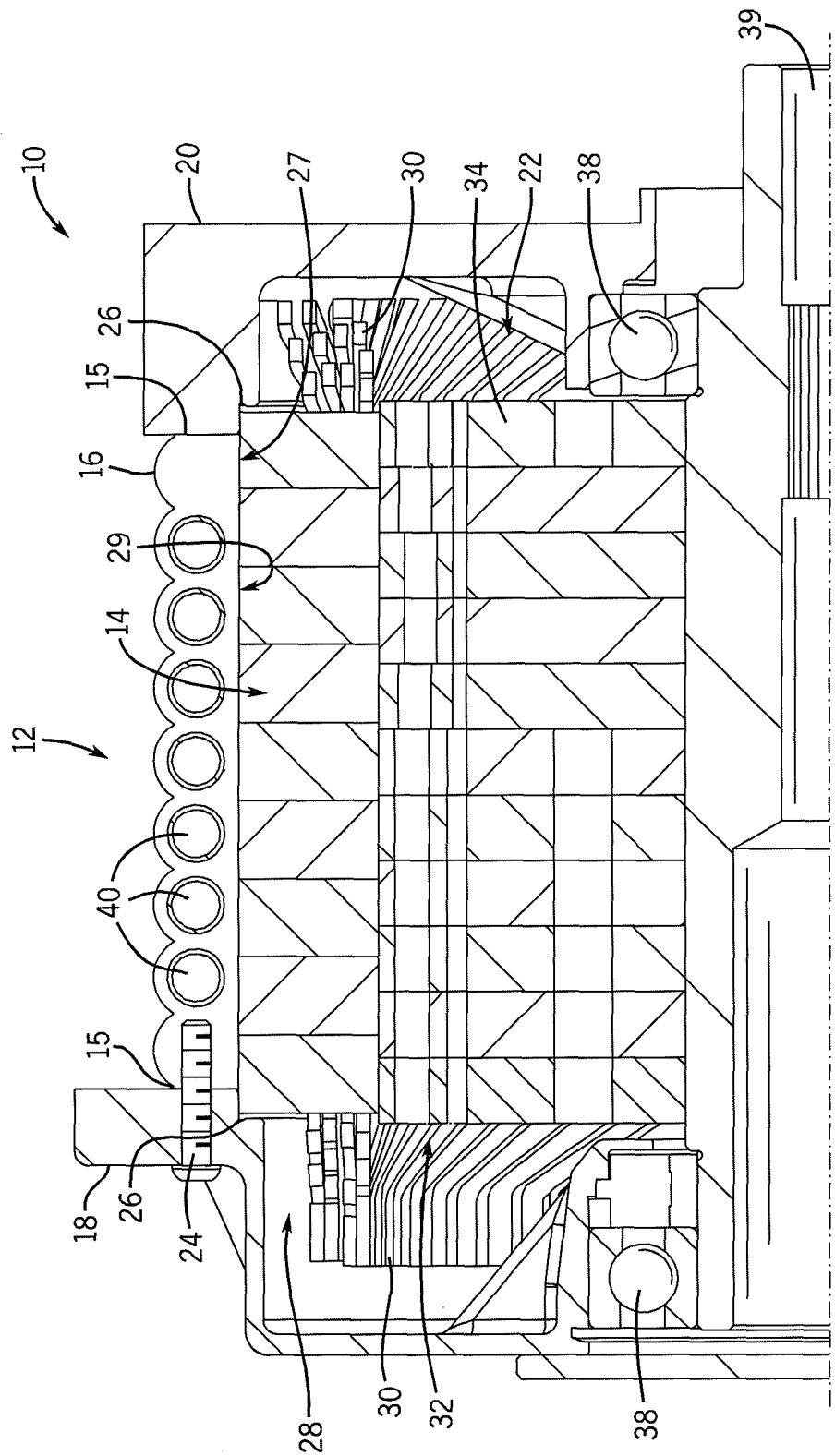
FIG. 1 is a cross-sectional view of a portion an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a portion of an electric machine module 10 according to one embodiment of the invention. The electric machine module 10 can include a housing 12 that can substantially surround an electric machine 14. The housing 12 can comprise a central member 16, a first end cap 18, and a second end cap 20. The electric machine 14 can be at least partially enclosed within a machine cavity 22. In some embodiments, the machine cavity 22 can be at least partially defined portions of the central member 16 and/or the end caps 18, 20. For example, the central member 16 and the end caps 18, 20 can be coupled via fasteners 24 or another suitable coupling manner, to at least partially enclose the electric machine 14 within the machine cavity 22. In some embodiments, gaskets 15 can be positioned substantially at the interface between the end caps 18, 20 and the central member 16 to aid in substantially sealing the machine cavity 22 from an environment substantially surrounding the housing 12. Also, in some embodiments, the central member 16, the end caps 18, 20, and the gaskets 15 can include coupling apertures 13 through which the fasteners 24 can be inserted to couple together the central member 16, the end caps 18, 20, and the gaskets 15. In other embodiments, at least one of the ends caps 18, 20 and the central member 16 can be formed as a single, integral substantially cylindrical canister and single end cap (not shown).

In some embodiments, the electric machine 14 can comprise a stator assembly 28 including stator end turns 30, a rotor assembly 32 including a rotor 34, bearings 38, and an output shaft 39. In some embodiments, the stator assembly 28 can at least partially circumscribe the rotor assembly 32.

Figure 2:
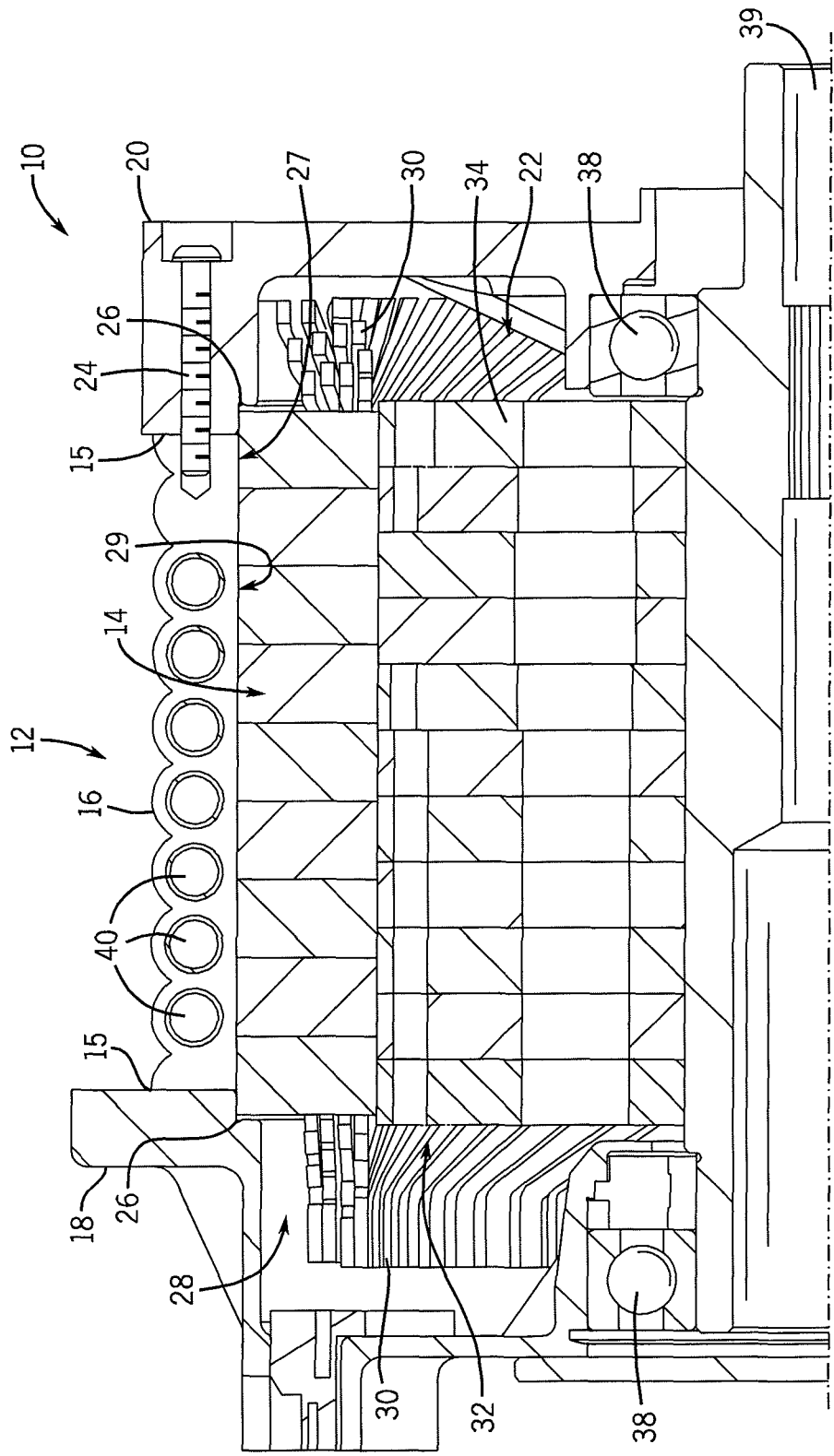
FIG. 2 is a cross-sectional view of another portion the electric machine module of FIG. 1.

The electric machine 20 can be, without limitation, an electric motor, such as a hybrid electric motor, an electric generator, a vehicle alternator, and/or an induction belt-driven alternator-starter (BAS). In one embodiment, the electric machine 20 can be a High Voltage Hairpin (HVH) electric motor or an interior permanent magnet electric motor for hybrid vehicle applications. Further, in some embodiments, the electric machine 14 can include a rotor hub (not shown) or the electric machine 14 can have a "hub-less" design, as shown in FIGS. 1 and 2.

Components of the electric machine 14 such as, but not limited to, the stator assembly 28 and the rotor assembly 32 can generate heat energy during the operation of the electric machine 14. These components can be cooled to enhance the performance and the lifespan of the electric machine 14.

In some embodiments, the electric machine module 10 can comprise at least one a coolant pipe 40. In some embodiments, the coolant pipe 40 can substantially coil around at least a portion of an outer perimeter 27 of the stator assembly 28 in a generally spiral and/or helical orientation. Other suitable coil configurations can also be used including asymmetric and/or coaxial configurations. Additional, axial orientations for the coolant pipe 40 can provide proper cooling in some embodiments. In some embodiments, the coolant pipe 40 can be formed into several parallel, curved, generally annular loops so that the coolant pipe 40 is positioned to substantially circumscribe at least a portion of the stator assembly 28, as shown in FIGS. 1-5. In some embodiments, the coolant pipe 40 can be positioned immediately adjacent to the outer perimeter 27 of the stator assembly 28. In some embodiments, at least a portion of the coolant pipe 40 can be positioned within the central member 16 so that the central member 16 is immediately adjacent to the outer perimeter 27 of the stator assembly 28, as described in further detail below. In some embodiments, the central member is not centrally located.

In some embodiments, the central member 16 can serve as a coupling member which can couple together the first end cap 16 and the second end cap 18 to form the housing 12. In some embodiments, the central member 16 can substantially circumscribe a portion of the electric machine 14, including portions of the stator assembly 28 as well as the coolant pipe 40, as shown in FIGS. 1 and 2. The central member 16 can include a molded structure comprising a metal, such as aluminum, a polymer, polycarbonate, another material, or a combination thereof. In one embodiment, the central member 16 can be formed or molded substantially around the coolant pipe 40, so that portions of the coolant pipe 40 can be positioned substantially within the central member 16. As a result, the central member 16 can provide support for the coolant pipe 40 and can aid in conducting a portion of the heat energy produced by the electric machine 14 to the coolant pipe 40.

In some embodiments, the coolant pipe 40 and the central member 16 can be formed before coupling to the electric machine 14. For example, in some embodiments, at least a portion of the coolant pipe 40 can be formed into a desired shape (as described in further detail below). In some embodiments, the coolant pipe 40 can be twisted, wound, or otherwise formed into a desired position.

In some embodiments, after forming into the desired shape, at least a portion of the coolant pipe 40 can be substantially coated with one or more materials so that at least a portion of the coolant pipe 40 can be substantially integral with the central member 16. For example, in some embodiments, at least a portion of the coolant pipe 40 can be coated with the material used to form the central member 16. By way of example only, in some embodiments, a volume of substantially liquid aluminum can be cast or otherwise molded around a portion of the coolant pipe 40 so that at least a portion of the coolant pipe 40 can be substantially integral with the central member 16.

In some embodiments, after forming and/or casting the central member 16 around at least a portion of the coolant pipe 40, an inner perimeter 29 of the central member 16 can be machined. For example, in some embodiments, to be able to fit at least a portion of the outer perimeter 27 of the stator assembly 28 within a portion of the inner perimeter 29 of the central member, the inner perimeter 29 can be sized to fit the stator assembly 28 (e.g., the inner perimeter 29 of the central member 16 and the outer perimeter 27 of the stator assembly comprise substantially similar sizes). In some embodiments, the inner perimeter 29 can be machined or otherwise shaped, sized, or configured so that at least a portion of the outer perimeter 27 of the stator assembly 28 can be coupled to a portion of the central member 16. In some embodiments, the stator assembly 28 can be interference fit, friction fit, coupled via conventional fasteners, adhesives, or other coupling methods to the central member 16, regardless of whether the central member 16 includes the coolant pipe 40.

In some embodiments, the combination of the close contact between portions of the central member 16 and the stator assembly 28 can at least partially improve electric machine cooling. For example, in some embodiments, the central member 16 can comprise a thermally conductive material, such as, but not limited to aluminum. As a result, in some embodiments, the central member 16, which as previously mentioned, can be closely coupled to a portion of the outer perimeter 27 of the stator assembly 28, can conduct at least a portion of the heat energy produced by the electric machine 14 to the coolant pipe 40.

In another embodiments, the central member 16 can be formed or molded substantially around an outside portion of the coiled coolant pipe 40 after the coolant pipe is positioned around at least a portion of the outer perimeter 27 of the stator assembly 28. As a result, in some embodiments, the coolant pipe 40 can be maintained in direct contact with the stator assembly 28.

In some embodiments, the electric machine module 10 can be fabricated in accordance with, but not limited to, the following steps. The coolant pipe 40 can be wound around the stator assembly 28 in a single spiral orientation or a reverse spiral orientation, as described below. The central member 16 can then be overmolded around the stator assembly 28 and the coolant pipe 40, as shown in FIGS. 1 and 2 (e.g., in order to fix the coolant pipe 40 in place around the stator assembly 28).

In some embodiments, the housing 12 can be further assembled. For example, in some embodiments, the first end cap 18 can be slid over the output shaft 39, then the rotor assembly 32 and the stator assembly 28, including the central member 16 and the coolant pipe 40 can be slid over the output shaft 39 until the stator assembly 28 is immediately adjacent to (e.g., abuts) a portion of the first end cap 18. The second end cap 20 can then be slid over the output shaft 39 until a portion of the second end cap 20 is immediately adjacent (e.g., abuts) to the stator assembly 28. Additionally, in some embodiments, at least one gasket 15 can be positioned between the central member 16 and at least one of the end caps 18, 20. In some embodiments, the fasteners 24 can then be used to couple together the central member 16 to the first end cap 18 and the central member 16 to the second end cap 20, as shown in FIGS. 1 and 2, respectively. As shown in FIGS. 1 and 2, some portions of the end caps 18, 20 can be configured and arranged to received portions of the stator assembly 28. For example, in some embodiments, the end caps 18, 20 can comprise a recess 26 configured and arranged to receive a portion of the stator assembly 28. Moreover, in some embodiments, the end caps 18, 20 can be configured and arranged to conform to the stator end turns 30, as shown in FIGS. 1 and 2.

In some embodiments, cooling of the electric machine 14 can be provided, at least in part, by the coolant pipe 40, as shown in FIGS. 1-5. In some embodiments, the coolant pipe 40 can comprise a generally circular cross-section, although the shape of the coolant pipe 40 can be selected based on end-use applications chosen by the manufacturer and/or user. Additionally, in one embodiment, the coolant pipe 40 can be formed from a metal such as copper. In other embodiments, the coolant pipe 40 also can be formed from a polymer, polycarbonate, another suitable material, or a combination thereof.

In some embodiments, end portions 42, 44 of the coolant pipe can extend in a substantially axial direction from the central member 16. For example, the end portions 42, 44 can extend from the central member 16 through a portion of the housing 12, as shown in FIGS. 3-6. In other embodiments, the end portions 42, 44 can be positioned in, on, or through other suitable regions of the electric machine module 10.

Figure 6:
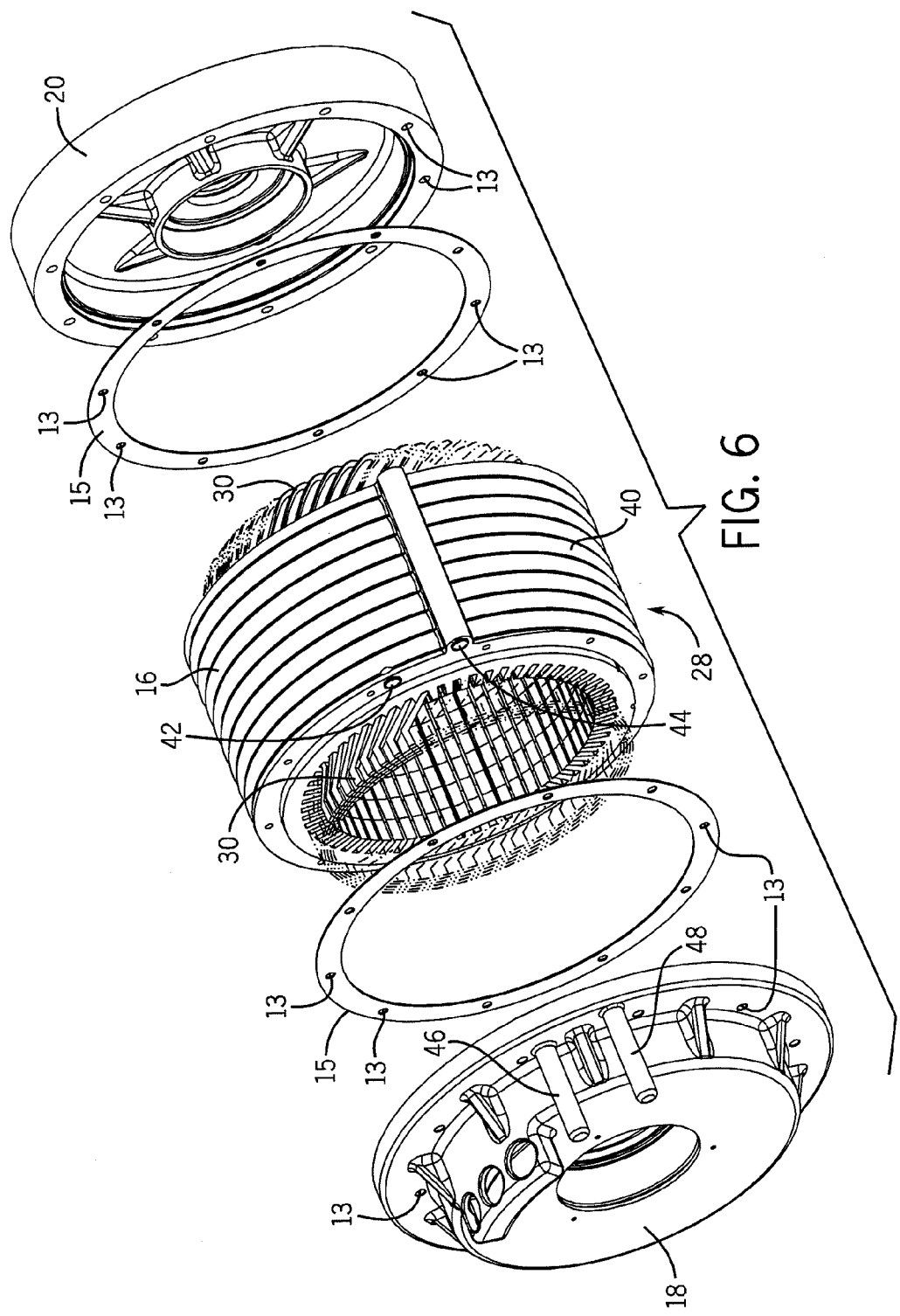
FIG. 6 is an exploded view of the electric machine module of FIG. 1.

In some embodiments, the end portions 42, 44 can axially extend through one of the end caps 18, 20. For example, the end caps 18, 20 can be configured and arranged to receive the end portions 42, 44 when the electric machine module 10 is substantially assembled, as described above. More specifically, the end caps 18, 20 can define an inlet 46 and an outlet 48, as shown in FIG. 6, so that when coupled to the central member 16, the end portions 42, 44 can at least partially extend into and terminate within the inlet 46 and the outlet 48. In one embodiment, the end portions 42, 44 can extend through the inlet 46 and the outlet 48 and terminate outside of the housing 12. Further, in some embodiments, the inlet 46 and the outlet 48 can be formed through the same end cap 18, 20. In some embodiments, the first end cap 18 can include the inlet 46 and the outlet 48. In other embodiments, the inlet 46 and the outlet 48 can be formed through different end caps 18, 20 and/or parts of the housing 12 or the electric machine module 10. In some embodiments, by including an inlet 46 and an outlet 48 through at least one of the end caps 18, 20, the module 10 can transfer more heat energy through the end caps 18, 20 to the coolant pipe 40 relative to some modules 10 not including an inlet 46 and an outlet 48 through the end caps 18, 20.

Figure 3A:
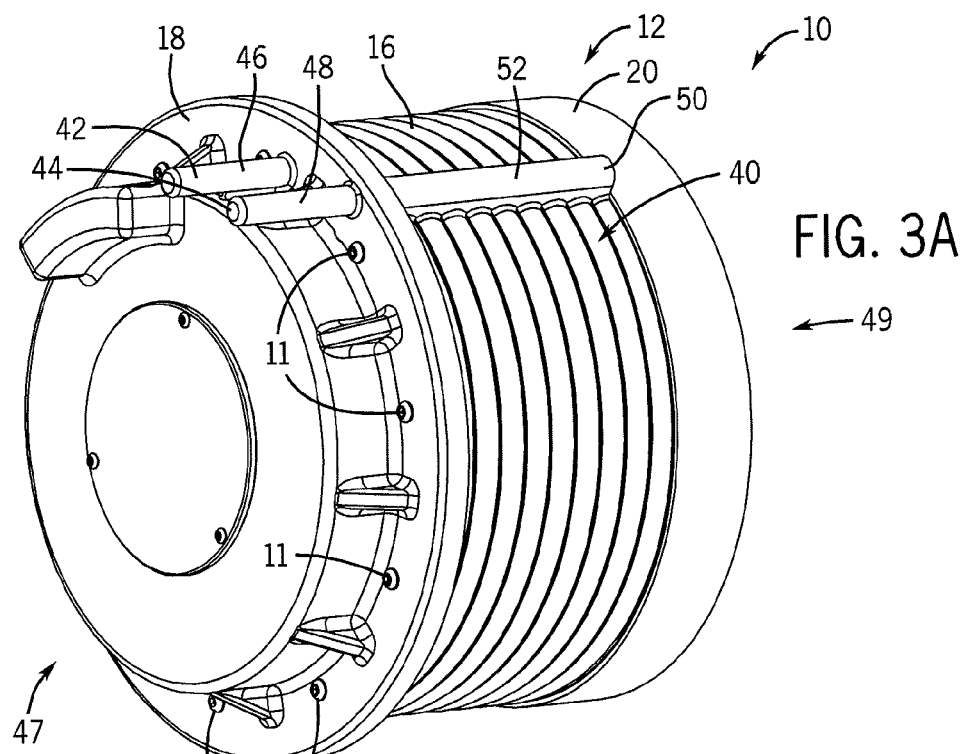
FIG. 3A is a perspective view of an electric machine module according to one embodiment of the invention.
Figure 3B:
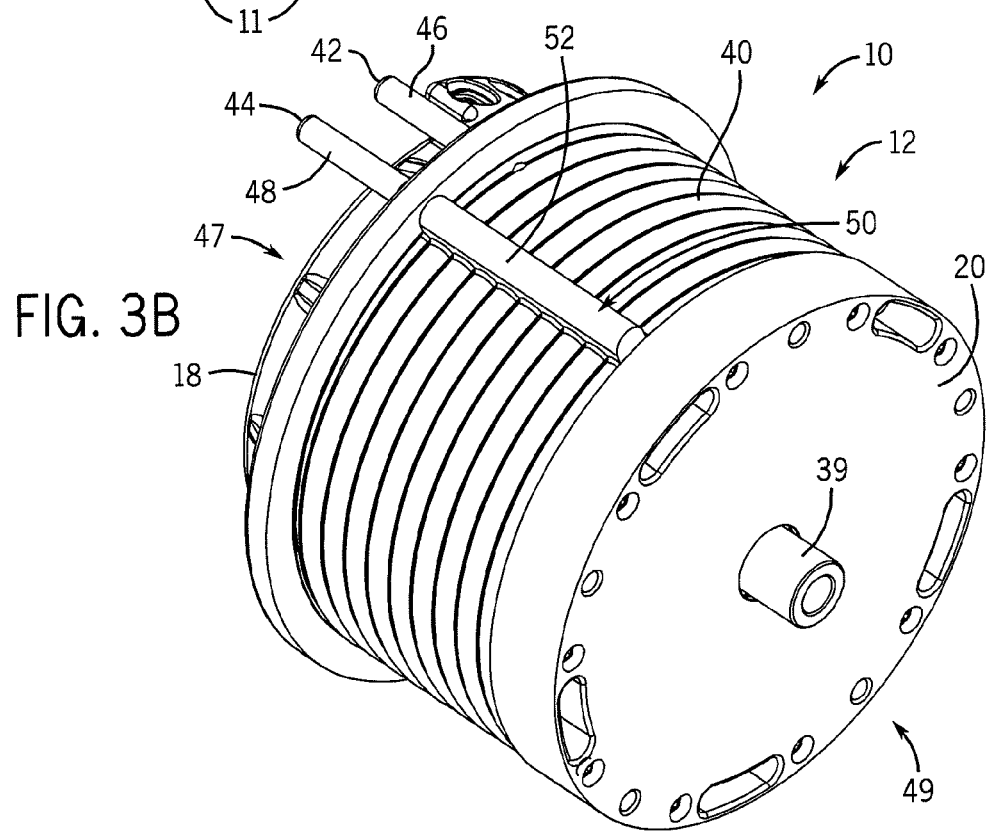
FIG. 3B is a perspective view of some assembled parts of the electric machine module of FIG. 3A.
Figure 5:
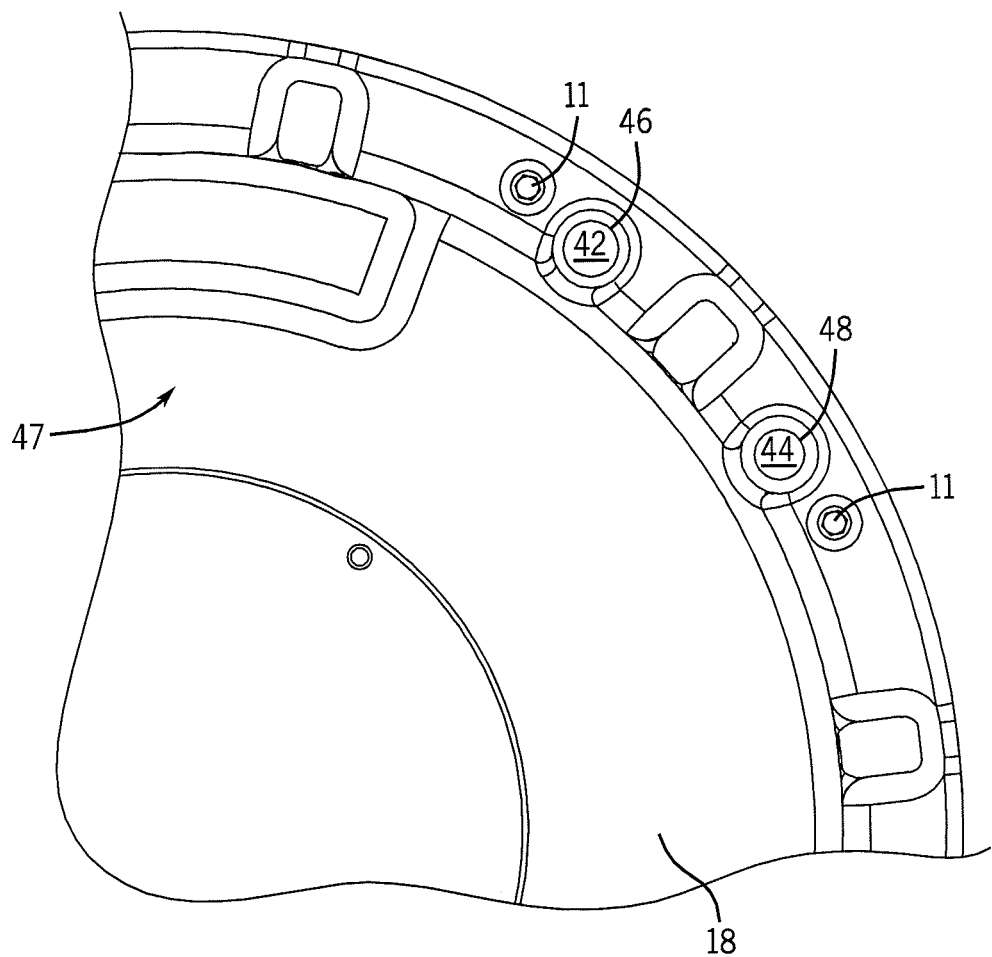
FIG. 5 is a partial view of the outside of an end cap of the electric machine module of FIG. 1.

As shown in FIGS. 3-5, the central member 16 and the coolant pipe 40 can substantially circumscribe at least a portion of the stator assembly 28. In some embodiments, the coolant pipe 40 can be coiled substantially around the stator assembly 28 in a single spiral orientation, as shown in FIGS. 3A-3B. In other embodiments, the coolant pipe 40 can be coiled substantially around the stator assembly 28 in a reverse spiral orientation, as shown in FIGS. 4A-4B.

In some embodiments, as shown in FIG. 3B, the coolant pipe 40 can be coiled in a single spiral orientation. The coolant pipe 40 can coil around the stator assembly 28 from an area near a first axial end 47 of the housing 12 toward an area near a second axial end 49 of the housing 12 in one substantially continuous spiral. For example, the inlet 46 and the outlet 48 can be positioned near the first axial end 47. In some embodiments, the end portion 42 can begin at the inlet 46 and can coil around the stator assembly 28 toward the second axial end 49. The subsequent coils of the coolant pipe 40 can substantially contact one another so that a maximum number of coils are wound around the stator assembly 28. In some embodiments, some spacing can be defined between each subsequent coil of the coolant pipe 40. At or near the second axial end 47, the coolant pipe 40 can comprise a first bended turn 50. At the first bended turn 50, the coolant pipe 40 can axially extend toward the first axial end 47 of the housing 12, rather than continuing to coil around. As a result of the first bended turn 50, the coolant pipe 40 can extend back toward the first axial end 47 so that the end portion 44 generally terminates at the outlet 48. In one embodiment, the first bended turn 50 can be an approximate ninety-degree turn, so than an extension 52 of the coolant pipe 40 between the first bended turn 50 and the end portion 44 can be substantially parallel to the output shaft 39, as shown in FIGS. 3A and 3B. Moreover, as previously mentioned, in some embodiments, the coolant pipe 40 can be formed in any of the previously mentioned configurations (e.g., a single spiral orientation) so that coolant pipe 40 can include the previously mentioned configurations before being positioned adjacent to the stator assembly 28.

In some embodiments, as shown in FIG. 4B, the coolant pipe 40 can be coiled in a reverse spiral orientation. In some embodiments, the coolant pipe 40 can coil around the stator assembly 28 from the area near the first axial end 47 of the housing 12 toward the area near the second axial end 49 of the housing 12 in one continuous spiral, and then coil around the stator assembly 28 from the second axial end 49 back toward the first axial end 47 in a reverse spiral. For example, in some embodiments, the inlet 46 and the outlet 48 can be positioned near the first axial end 47. The end portion 42 can begin at the inlet 46 and coil around the stator assembly 28 in a first direction toward the second axial end 49. The subsequent coils of the coolant pipe 40 in the first direction can be substantially spaced apart. In some embodiments, at or substantially adjacent to the second axial end 47, the coolant pipe 40 can comprise a second bended turn 54. In some embodiments, at the second bended turn 54, the coolant pipe 40 can substantially change direction by about one hundred eighty degrees so that the coolant pipe 40 can be coiled around the stator assembly 28 in a second direction toward the first axial end 47. In some embodiments, the coils in the second direction can be positioned within the spacing between the coils in the first direction. As a result, the coolant pipe 40 can comprise a reverse spiral extending toward the first axial end 47 of the housing 12 so that the end portion 44 can terminate in the outlet 48, as illustrated in FIGS. 4A and 4B. Moreover, as previously mentioned, in some embodiments, the coolant pipe 40 can be formed in any of the previously mentioned configurations (e.g., a reverse spiral orientation) so that coolant pipe 40 can include the previously mentioned configurations before being positioned adjacent to the stator assembly 28.

In some embodiments, a coolant can be introduced into the coolant pipe 40 through the inlet 46 to aid in cooling the electric machine module 10. In some embodiments, the coolant can comprise oil, water, a water/ethylene glycol mixture, ethylene glycol, transmission fluid, or another fluid, mist, gas, etc. In some embodiments, the coolant can be dispersed from a coolant source (not shown) through the inlet 46. The coolant can circulate inside the coolant pipe 40 and can receive at least a portion of the heat energy generated by the electric machine 14 operating within the housing 12 through forced convection. For example, in some embodiments, at least a portion of the heat energy produced can be transferred through the stator assembly 28 and the central member 16 and can be received by the coolant flowing through the coolant pipe 40. Additionally, in some embodiments, enhanced cooling can occur due to the cooling pipe 40 substantially circumscribing the housing 12 substantially adjacent to the stator assembly 28 and the rotor assembly 32 (e.g., because the coolant is more concentrated in areas where the heat energy is generally being produced). The coolant can exit the coolant pipe 40 through the outlet 48 and can be circulated to a heat exchanger (not shown). The heat exchanger can remove at least a portion of the heat energy transferred to the coolant while circulating through the coolant pipe 40. In addition, in some embodiments, heat generated by the electric machine can be conducted through the aluminum central member 16, as well as the end caps 18, 20.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   a housing including at least one end cap coupled to a central member and defining at least a portion of a machine cavity,
   the housing including a first axial end and a second axial end,
   the central member including at least a portion of a coolant pipe, the coolant pipe including end portions extending at least partially through the at least one end cap;
   an electric machine including a stator assembly, at least a portion of the electric machine positioned within the housing and at least partially enclosed by the housing so that the coolant pipe is substantially coiled around at least a portion of an outer perimeter of the stator assembly;
   wherein the coolant pipe extends an axial distance from a point substantially adjacent to the first axial end to a point substantially adjacent to the second axial end and the end portions are adjacent to the point substantially adjacent to one of the first axial end and the second axial end; and
   wherein the coolant pipe comprises a reverse spiral orientation so that the coolant pipe is coiled around the stator assembly substantially from the first axial end to the second axial end in a first direction and then coiled back around the stator assembly substantially from the second axial end to the first axial end in a second direction.

2. The electric machine module of claim 1, wherein the at least one end cap includes an inlet and an outlet, wherein a first of the end portions extends through the inlet and a second of the end portions extends through the outlet.

3. The electric machine module of claim 1, wherein the central member comprises aluminum and is substantially formed around at least a portion of the coolant pipe prior to positioning the electric machine within the housing.

4. The electric machine module of claim 1, and further comprising a coolant capable of being dispersed into a first of the end portions, through the coolant pipe, and out of a second of the end portions.

5. The electric machine module of claim 1, wherein the coolant pipe comprises a single spiral orientation so that the coolant pipe is coiled around the stator assembly in a first direction substantially from the first axial end to the second axial end.

6. The electric machine module of claim 5, wherein the coolant pipe comprises an approximate ninety-degree turn near the second axial end so that the coolant pipe extends axially toward the first axial end.

7. The electric machine module of claim 1, wherein the coolant pipe comprises an approximate 180-degree turn near the second axial end so that the coolant pipe coils back toward the first axial end.

8. The electric machine module of claim 1, wherein the coolant pipe comprises copper.

9. The electric machine module of claim 1, wherein the coolant pipe is separated from the stator assembly by the central member.

10. The electric machine module of claim 1, wherein the coolant pipe is in direct contact with the stator assembly.

11. The electric machine module of claim 1, wherein the at least one end cap includes a first end cap and a second end cap, wherein the central member is coupled to the first end cap and the second end cap by fasteners.

* * * * *